J. B. MILLER.

RECEPTACLE AND BLANK THEREFOR.

APPLICATION FILED JUNE 24, 1914.

Reissued Oct. 20, 1914.

13,812.

2 SHEETS—SHEET 1.

Witnesses:
R. S. Trogner.
Albert L. Kelly

Inventor:
James B. Miller,
By Harvey Cole
Attys.

J. B. MILLER.

RECEPTACLE AND BLANK THEREFOR.

APPLICATION FILED JUNE 24, 1914.

Reissued Oct. 20, 1914.

13,812.

2 SHEETS—SHEET 2.

Witnesses:
R. S. Trogner
Albert L. Krey

Inventor:
James B. Miller.
By Dorsey & Cole
Attys.

UNITED STATES PATENT OFFICE.

JAMES B. MILLER, OF ROCHESTER, NEW YORK.

RECEPTACLE AND BLANK THEREFOR.

13,812. Specification of Reissued Letters Patent. Reissued Oct. 20, 1914.

Original No. 926,758, dated July 6, 1909, Serial No. 459,845. Application for reissue filed June 24, 1914. Serial No. 847,120.

*To all whom it may concern:*

Be it known that I, JAMES B. MILLER, a citizen of the United States, and a resident of Rochester, in the county of Monroe and State of New York, have invented a new and Improved Receptacle and Blank Therefor, of which the following is a specification.

This invention relates to receptacles such as may be formed of paper, card-board, press-board, fiber or other like flexible material.

An object of my present invention is to provide a receptacle of the character described and a blank therefor which may be formed with a minimum amount of waste from a substantially rectangular sheet.

Another object of my invention is as follows, viz.,—to provide a receptacle of the character described which shall have a cover integrally formed with the rest of the receptacle and adapted by means of a flexible connection with the receptacle to be opened or closed as desired.

Still another object of my invention is to provide a receptacle of the character described in which the side walls and bottom shall be double and in which also one series of side walls shall coöperate to hold the other in place, so that when one series of side walls is secured together by means of substantially the usual slip lock, the whole receptacle becomes a comparatively rigid structure, becoming still more so when the cover is locked in closed position. The locking of the one series of side walls together in the manner described constitutes a form in which the other series of side walls and the corresponding bottom may be held.

In the accompanying drawings, I have shown only that embodiment of my invention in which the receptacle is oblong with rounded corners and is slightly larger at the top than at the bottom. I desire, however, to call especial attention to the fact that a receptacle may be made, in accordance with my present invention, square or oblong and with either square or rounded corners as desired and tapered also when desired.

The drawings are as follows:—

Figure 1:
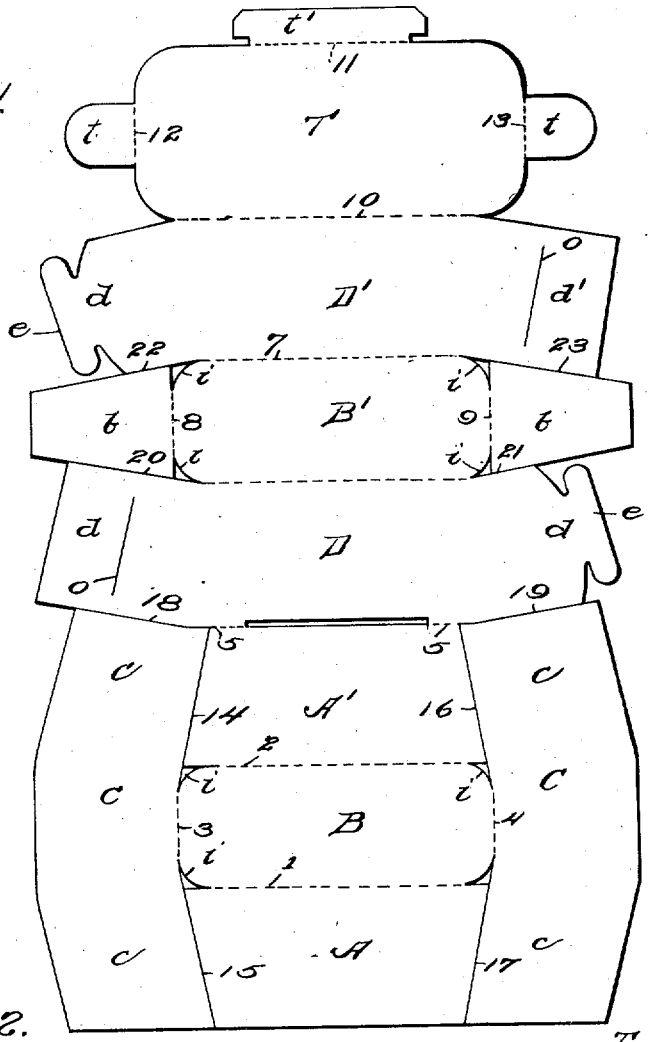
Figure 2:
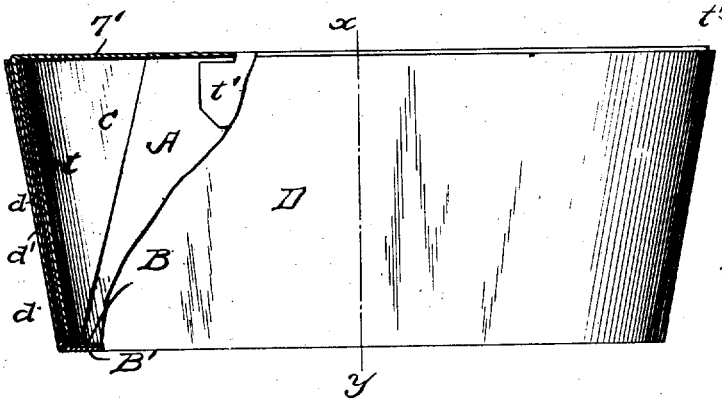
Figure 3:
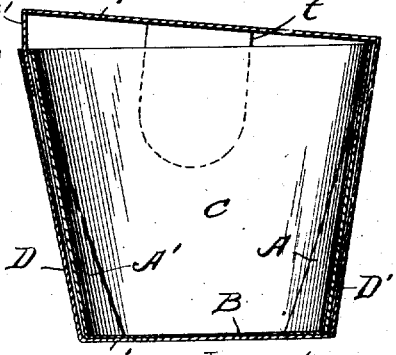
Figure 4:
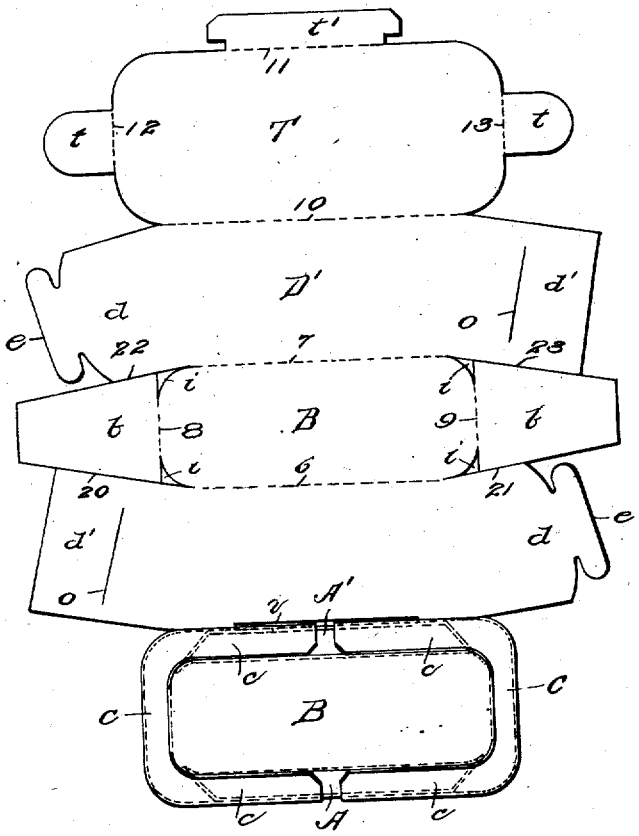
Figure 5:
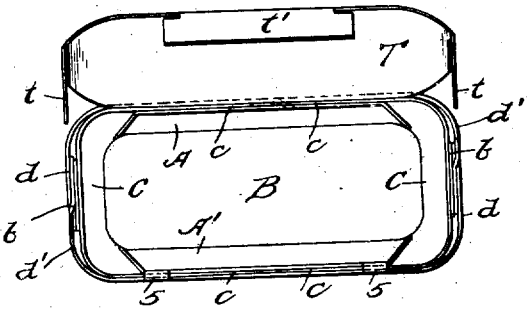
Figure 6:
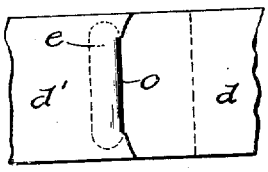

Figure 1, shows a plan view of the blank from which my receptacle may be formed. Fig. 2, is a side view of a completed receptacle with the cover closed and with a part of the side wall toward the observer and at the left hand end of the figure removed. Fig. 3, is a vertical sectional view of the receptacle as seen from the right and taken along the dotted line $x$—$y$ of Fig. 2, and with the cover slightly raised. Fig. 4, shows the blank partly formed up, that is, with the inner series of side walls bent up to position from the bottom and with the bottom of the inner section toward the observer. Fig. 5, is a top or plan view of the receptacle with the cover partly opened. Fig. 6, is a detail view of one of the slip joints, when closed, for locking the sides together.

Similar characters refer to similar parts throughout the several views.

In forming up a receptacle in accordance with my invention, I provide a blank cut to the general conformation indicated in Fig. 1, which is scored, to facilitate folding, along the dotted lines 1 to 13 inclusive and cut along the continuous lines 14 to 23 inclusive, and cut through to form slits as seen at $o$ and at $v$. When thus treated the blank comprises a bottom B, and connected therewith side walls A and A′, and end walls C, having thereon flaps $c$, and also a second bottom B′ having end walls $b$ flexibly connected therewith and side walls D and D′.

When the receptacle is to have rounded corners, the corners of the bottoms B and B′ are rounded by removing sections $i$ at the corners between the bottom B and the end pieces C and the side pieces A and A′, and also between the end pieces $b$ and the side walls D and D′ and the bottom B′; and in this case the cover section T will have the corners also suitably rounded as indicated.

In forming up the receptacle from the blank, the bottom piece B may be raised toward the observer in Fig. 1, and the side members A and A′ folded to occupy the proper angular relation thereto, and then the end pieces C with the flaps $c$ thereon, may be similarly folded downwardly away from the observer and the flaps $c$ formed around the outside of the sides A and A′ as clearly indicated in Fig. 4. The folded up section of the receptacle of which the portion B is the bottom, is then folded down upon the side D and then again turned so the bottom B rests upon the bottom B′ after which the ends $b$ are folded up against the outside of the ends C, then the side wall D′ is folded up and the flaps *d* and *d′* formed around outside of the members *b* with the locking members *e* inserted in the slits *o* thereof. The parts then assume the positions shown in plan view in Fig. 5, with the cover T still open; in closing the cover the flaps *t* are inserted between the members *d′* and *b* at the ends of the receptacle, and the locking member *t′* is inserted in the cut *v* therefor, and when thus inserted, it operates to hold the cover closed in the well known way.

The locking members *d* with the catch members *e* thereon coöperate in the well known way to hold the flaps *d* and *d′* together as indicated in Fig. 6, where the portion of the locking member *e* inserted through the slit *o* therefor is shown in dotted lines. The flaps *c* on the side of the receptacle toward the observer in Fig. 5, are held in place by the folds at lines 5, and on the rear side of the receptacle by the fold at line 10, when the cover is closed.

It will be noted that the body part of the blank (thus excluding the cover) is in two parts, each part constituting a bottom, sides (this including ends), and that in folding the blank the parts are folded the one after the other, one part being formed in its completed shape before the fold of the other part is commenced. It thus follows that the bottom and side members of one part are entirely contained above and within the bottom and side members of the other part, and that the side members of the respective parts do not alternate with one another.

What I claim is:—

1. An integrally formed blank for the purpose described, comprising two bottom members each having connected therewith a series of side wall members, such bottom members adapted to be super-imposed one upon the other, one series of side members adapted to nest within the other and one series operating to hold the other in place, and a cover member connected to a side member of one series and having thereon flaps adapted to engage between the inner and outer series of members and also a flap adapted to enter into locking engagement with and between the inner and outer side walls.

2. An integrally formed blank for the purpose described, comprising two bottom members each having connected therewith a series of side members, one bottom and its corresponding series of side members adapted to nest within the other and a cover member adapted to occupy either an open or closed position and having flaps thereon adapted to engage between the outer and inner series of side members and a locking flap adapted to enter into locking engagement between and to be held by a fold between the outer and inner series of side members.

3. An integrally formed blank for the purpose described comprising two bottom members and two corresponding series of side members, one bottom member and its series of side members adapted to nest within the other with the bottom members superimposed one upon the other, one series of side members having flaps adapted to make locking engagement with each other and operating to hold the other series in place and a cover member connected to a side member of one series.

4. A receptacle formed from an integral blank, comprising two bottom members each having connected therewith a series of side wall members, such bottom members superimposed one upon the other and one series of such side members nested within the other and one series operating to hold the other in place and a cover member connected to a side member of one series and having thereon flaps adapted to engage between the inner and outer series of side members and also a flap adapted to enter into locking engagement with and between the inner and outer side walls.

5. A receptacle formed up from an integral blank, comprising two bottom members each having connected therewith a series of side members; one such bottom and its corresponding series of side members nested within the other and a cover member adapted to occupy either an open or closed position and having flaps thereon adapted to engage between the outer and inner series of side members and a locking flap adapted to enter into locking engagement between and to be held by a fold between the outer and inner series of side members.

6. A receptacle formed from an integral blank, comprising two bottom members and two corresponding series of side members, one bottom member and its series of side members nesting within the other, with the bottom members super-imposed one upon the other, the outer series of side members having flaps making a locking engagement with each other and operating to hold the other series in place.

7. A receptacle formed from an integral blank, comprising two bottom members and two corresponding series of side members, one bottom member and its series of side members nesting within the other, with the bottom members super-imposed one upon the other, the outer series of side members having flaps making a locking engagement with each other and operating to hold the other series in place, and all of the side members of the upper bottom member being located within the side members of the lower bottom member.

8. A receptacle formed from an integral blank, comprising two bottom members and two corresponding series of side members, one bottom member and its series of side members nested within the other with the bottom members super-imposed one upon the other, one series of side members having flaps making a locking engagement with each other and operating to hold the other series in place and a cover member connected to a side member of one series.

9. An integrally formed blank for the purpose described comprising two bottom members each having connected therewith a series of side members, such bottom members adapted to be super-imposed one upon the other, one series of side members adapted to nest within the other and one series operating to hold the other in place, and a cover member connected to a side member of one series.

10. A receptacle formed from an integral blank, comprising two bottom members each having connected therewith a series of side wall members, such bottom members super-imposed one upon the other and one series of such side members nested within the other and one series operating to hold the other in place and a cover member connected to a side member of one series.

11. A receptacle formed from an integral blank, comprising two bottom members each having connected therewith a series of side wall members, such bottom members super-imposed one upon the other and one series of such side members nested within the other and one series operating to hold the other in place and a cover member connected to a side member of one series and a locking means for holding the outer series of side members in place.

JAMES B. MILLER.

Witnesses:
LAURA PARDEE,
THOS. G. BURKE.